United States Patent [19]

Uchikoshi

[11] Patent Number: 5,013,901
[45] Date of Patent: May 7, 1991

[54] TRACKING CONTROL METHOD FOR ELIMINATING A TRACKING ERROR DUE TO A MOVEMENT OF AN OBJECTIVE LENS

[75] Inventor: Gohji Uchikoshi, Higashimurayama, Japan

[73] Assignee: Nakamichi Corporation, Kodaira, Japan

[21] Appl. No.: 354,147

[22] Filed: May 18, 1989

[30] Foreign Application Priority Data

May 18, 1988 [JP] Japan .................................. 63-121401

[51] Int. Cl.$^5$ ................................................ G05B 1/00
[52] U.S. Cl. .................................... 250/202; 369/44.22
[58] Field of Search ...................... 250/201.5, 202, 204; 369/44.21, 44.22

[56] References Cited

U.S. PATENT DOCUMENTS 4,517,666 5/1985 Ando ..................................... 250/202

Primary Examiner—David C. Nelms
Assistant Examiner—Stephone B. Allen
Attorney, Agent, or Firm—Pearne, Gordon, McCoy & Granger

[57] ABSTRACT

A tracking control method in which at least an objective lens within an optical pick-up is so controlled as to be driven in a radius direction of an optical disk having grooves (in a direction traversing track of the optical disk) relative to detectors of two-divided detector means for detecting reflected light quantities of reflected beam obtained by irradiating laser convergent beam of spot diameter defined by $\lambda/NA$ on the optical disk in a manner in which a detection range is divided in the radius direction by estimating a difference information between the detected reflected light quantities, a range of the reflected beam irradiating the detectors being so set that the detectors detect the reflected light quantity equal to each other at a track-on state of irradiation point even though the objective lens moves in the radius direction.

3 Claims, 21 Drawing Sheets

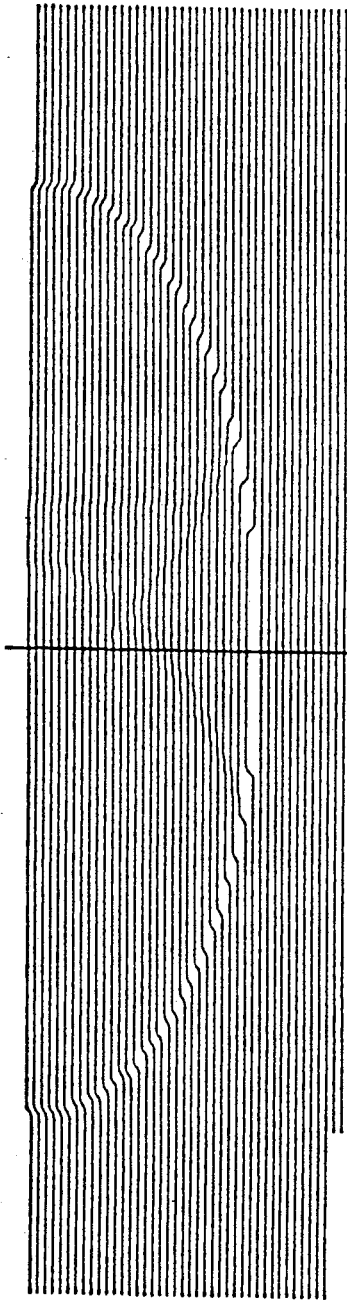
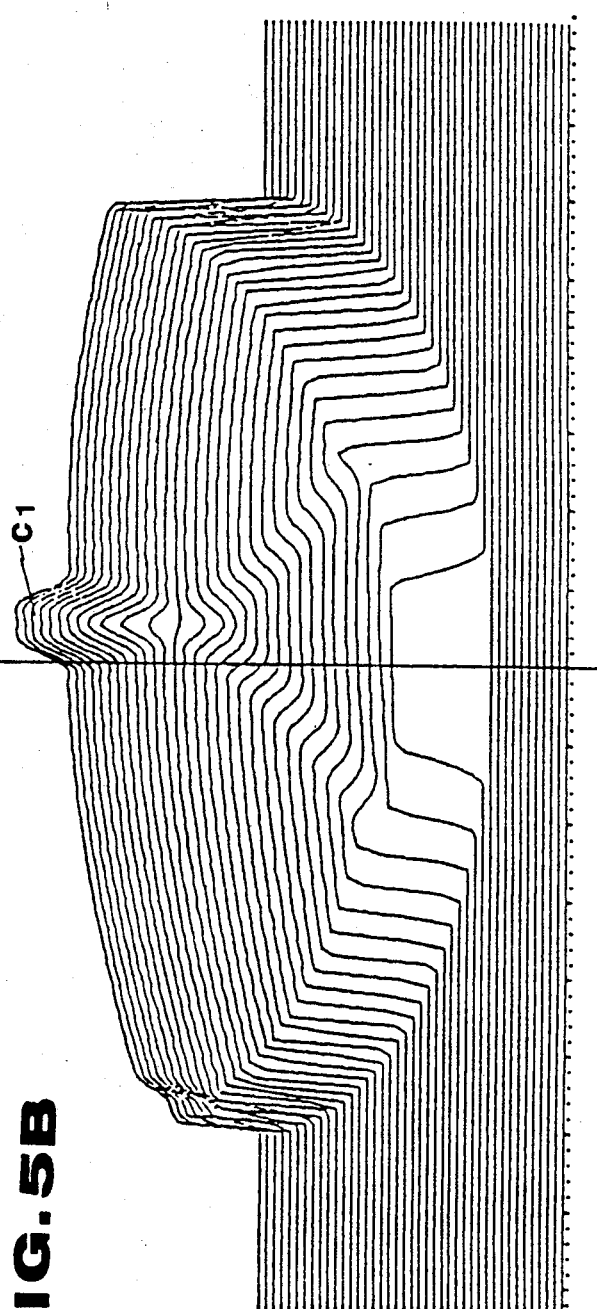
FIG. 5A
FIG. 5B

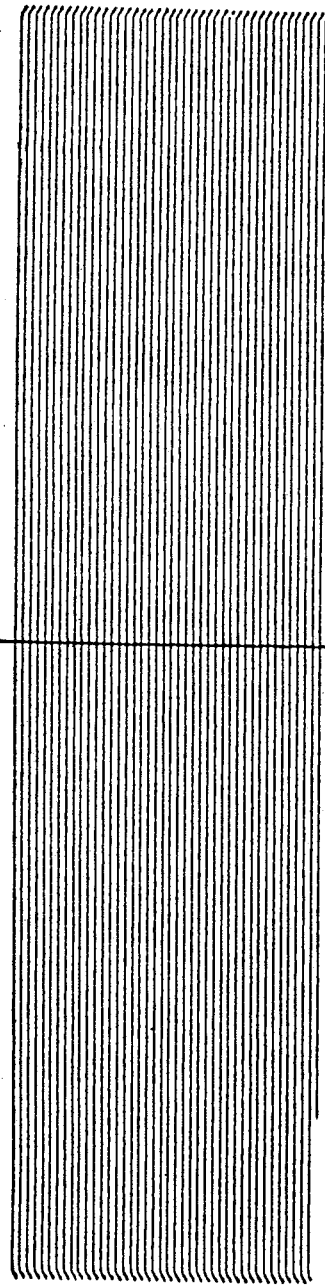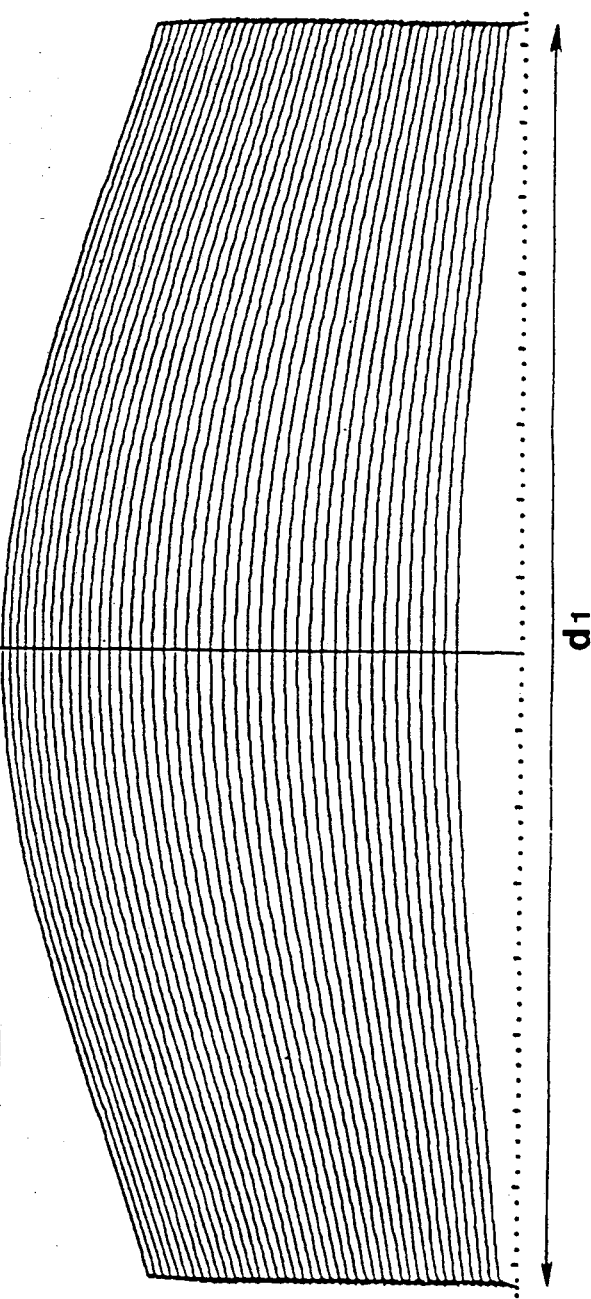

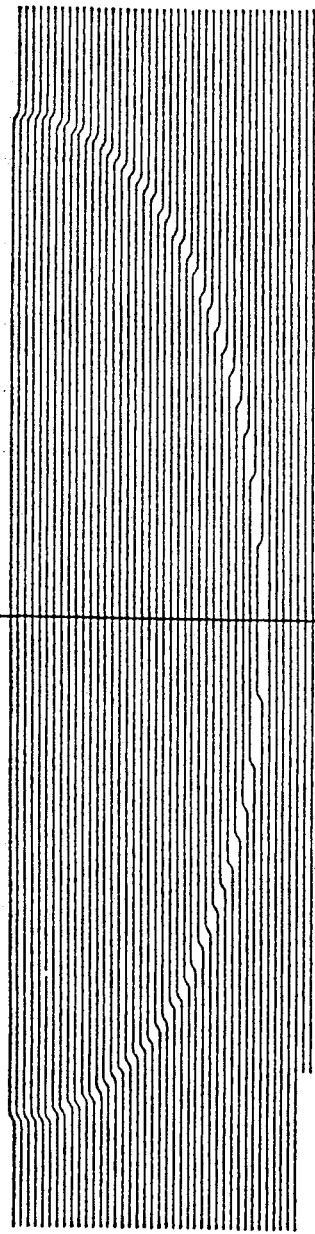
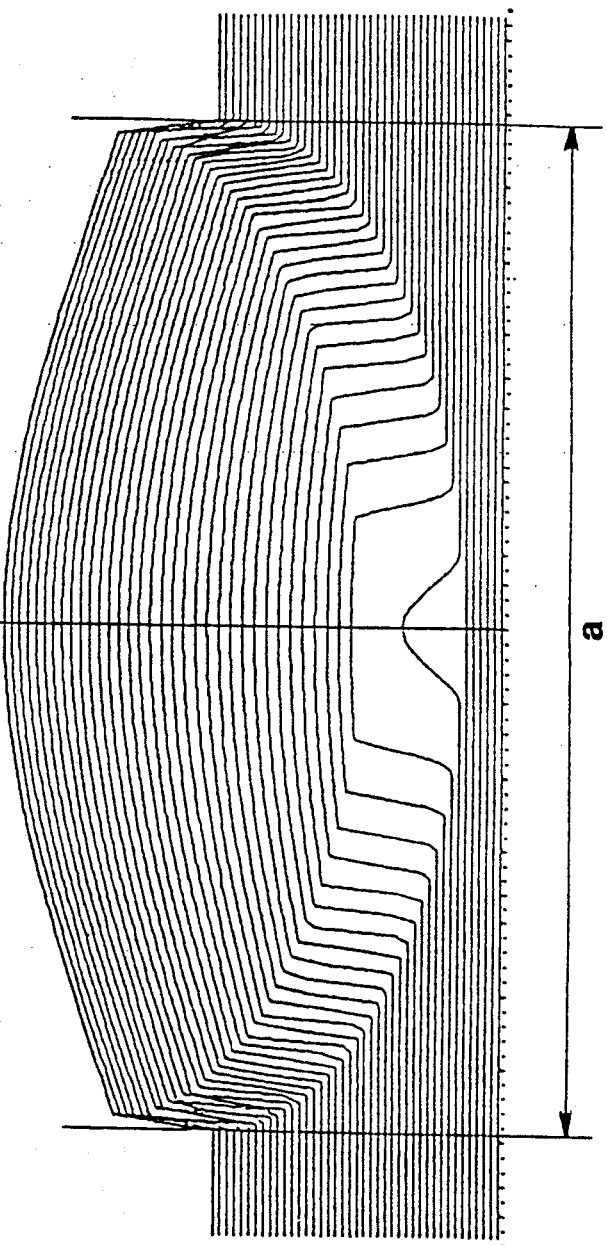
FIG. 8A
FIG. 8B

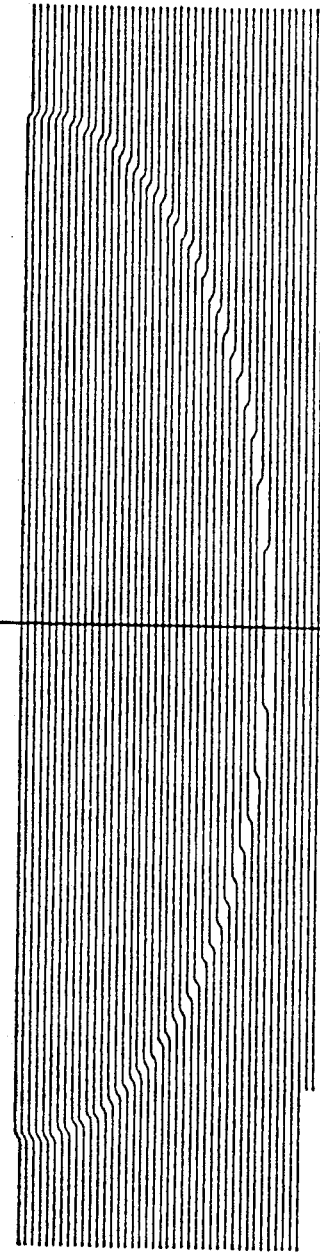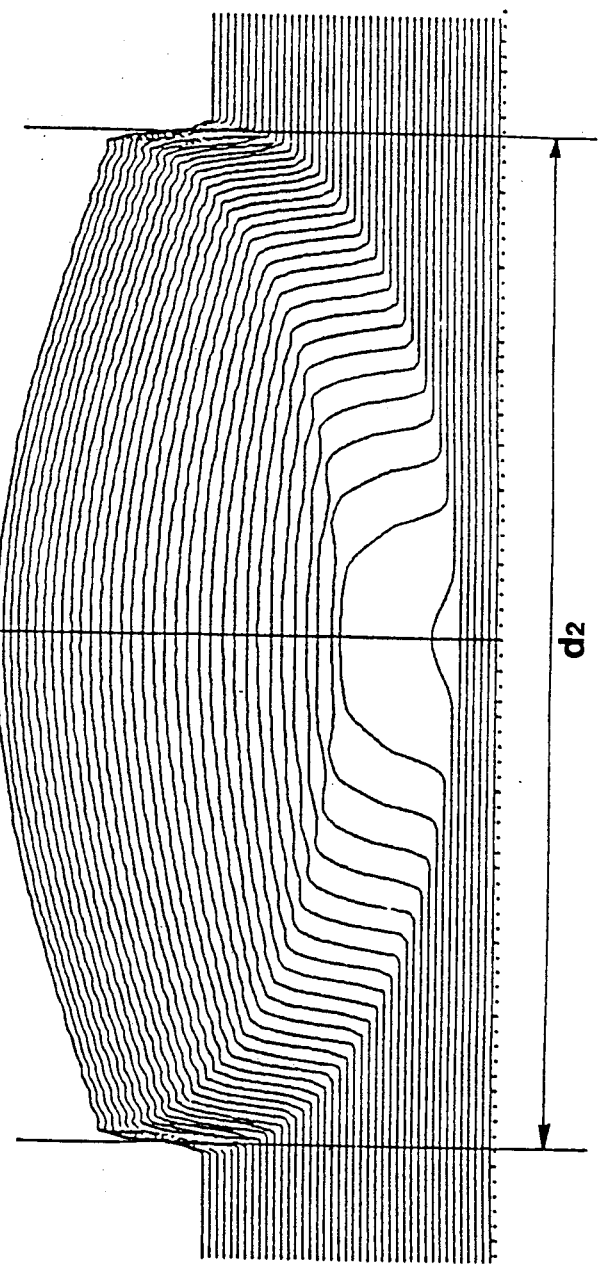
FIG.10A
FIG.10B

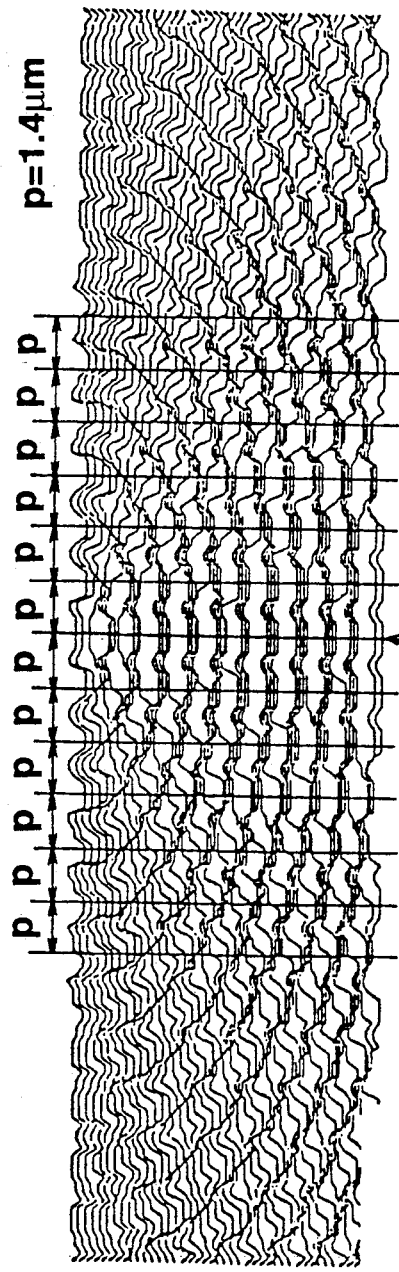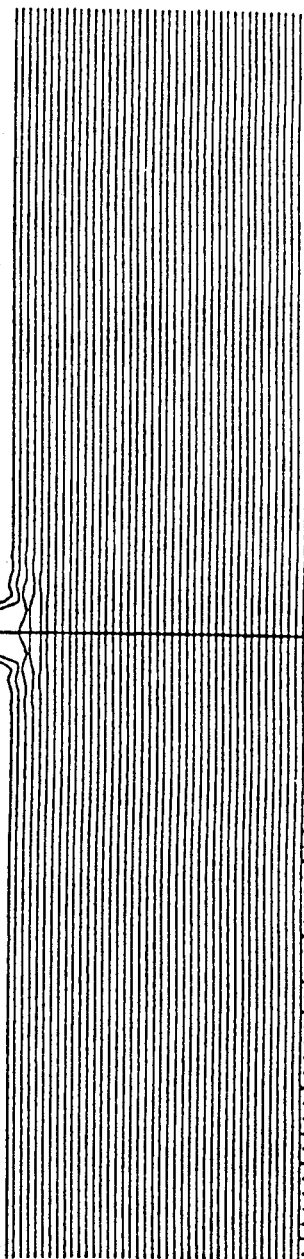
FIG.11A
FIG.11B

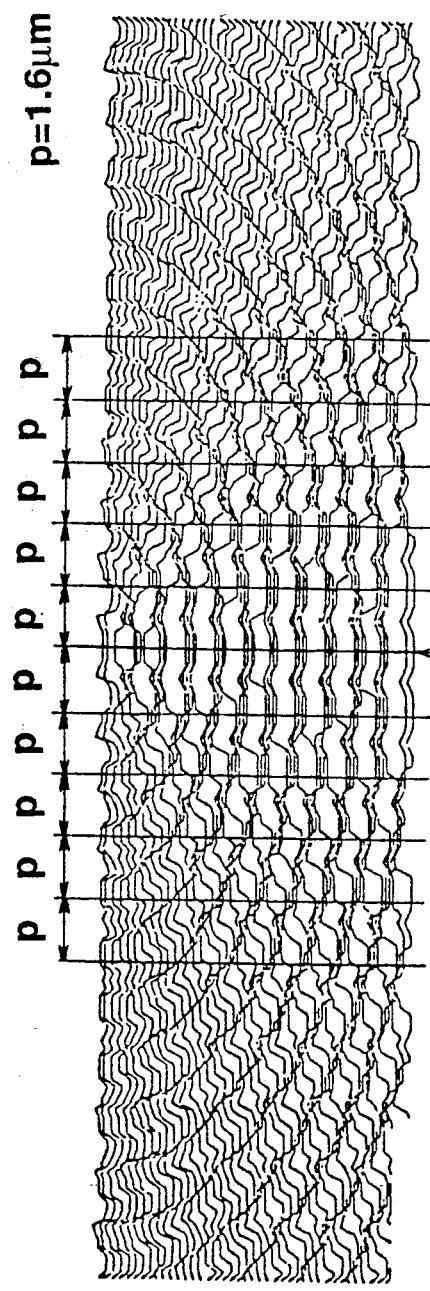
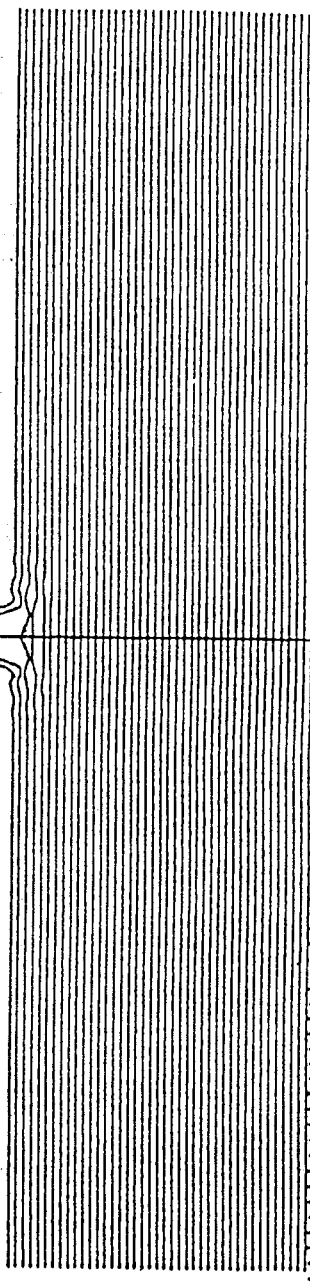
FIG.13A
FIG.13B

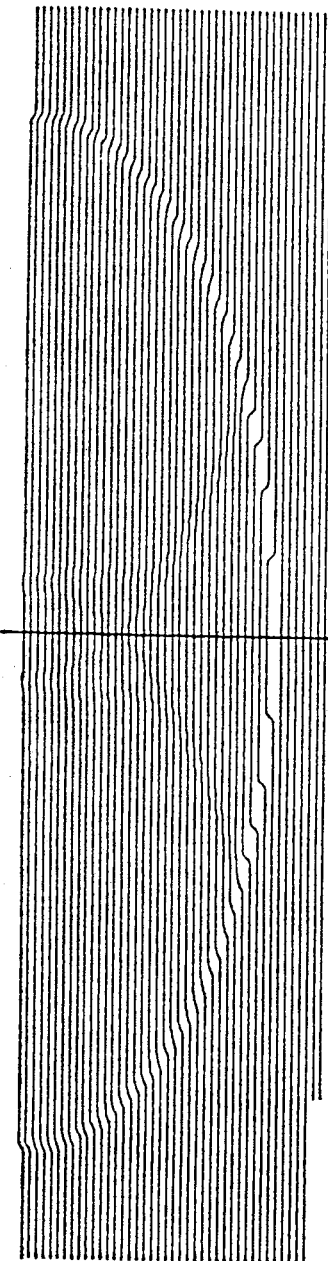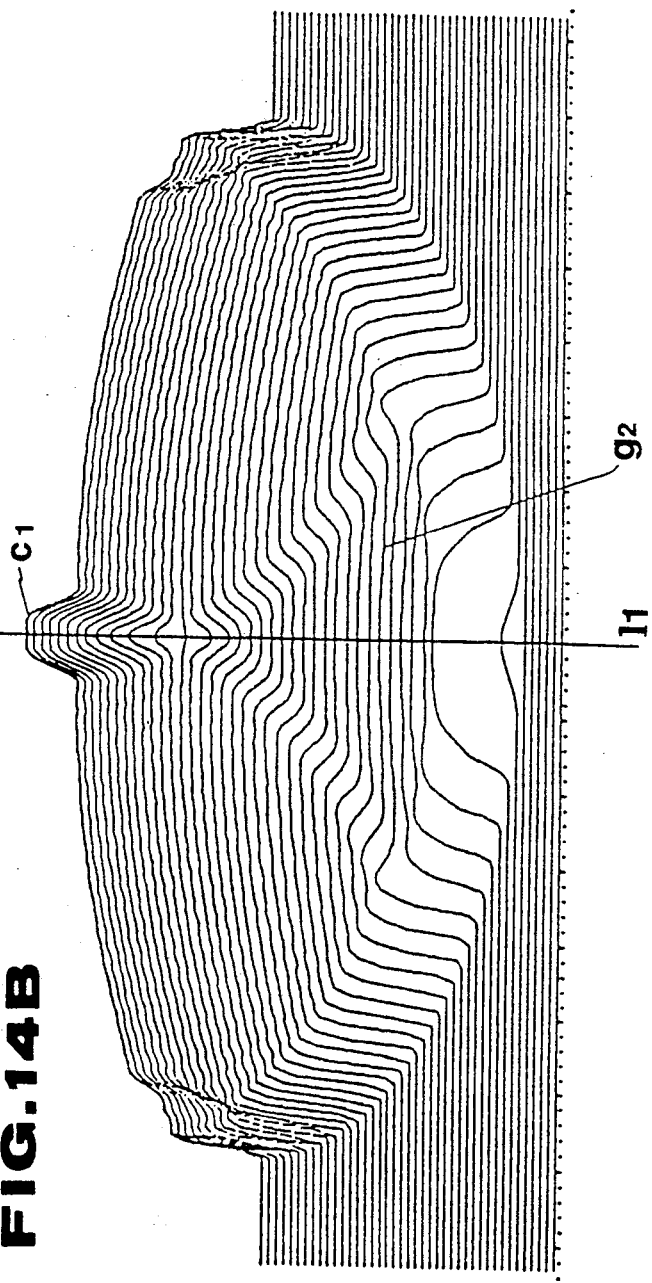
FIG.14A
FIG.14B

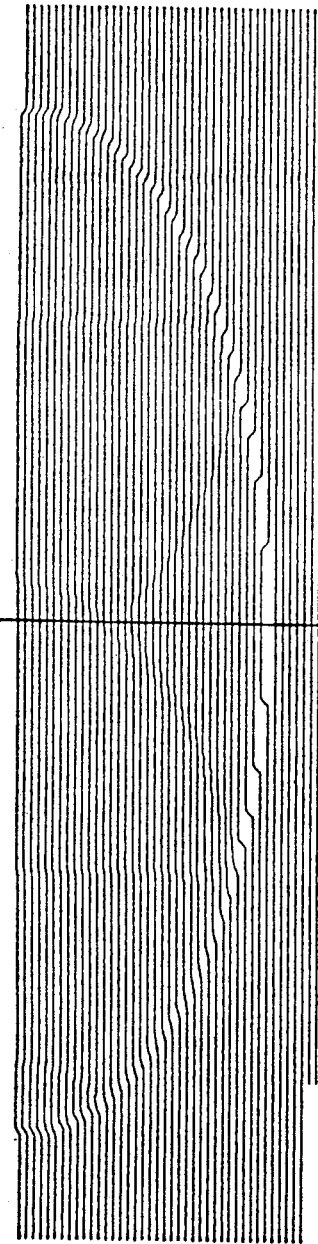
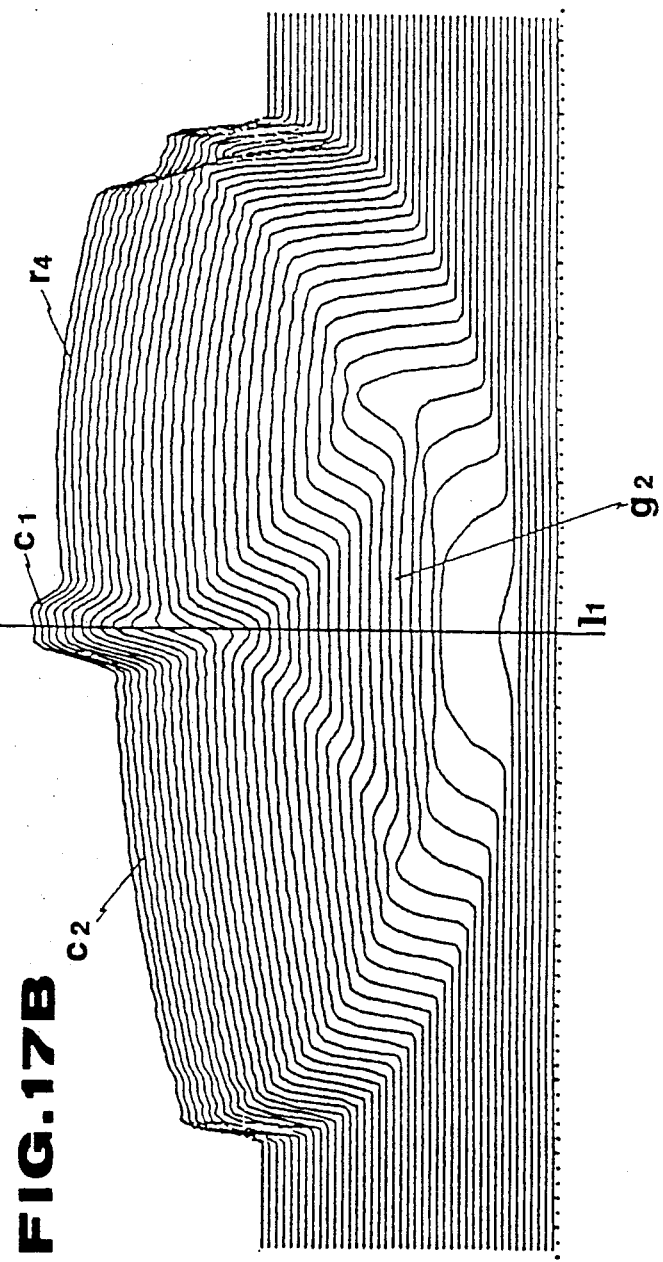
FIG.17A
FIG.17B

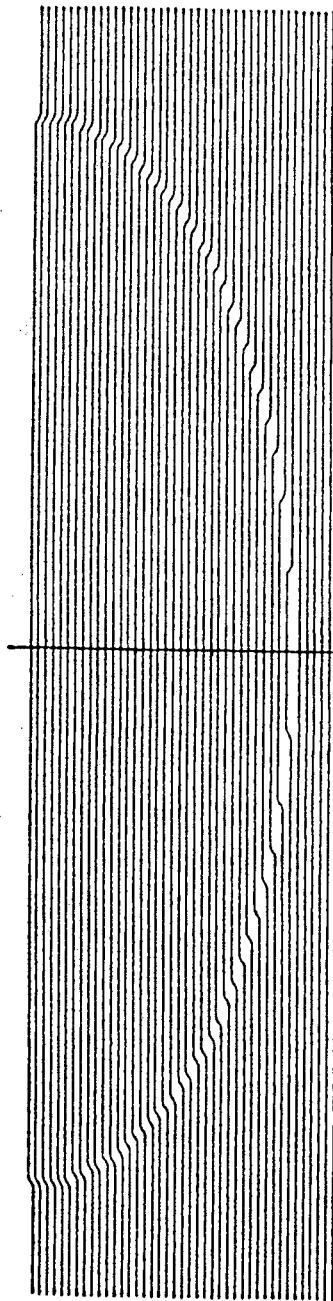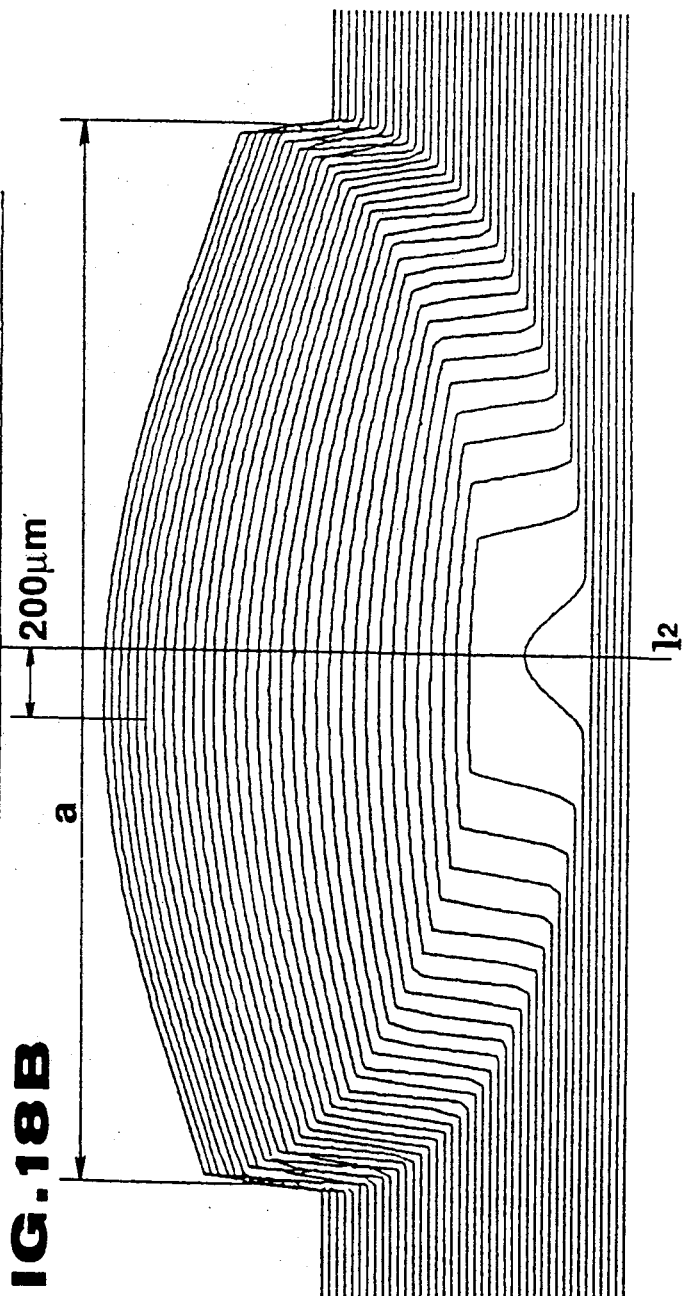

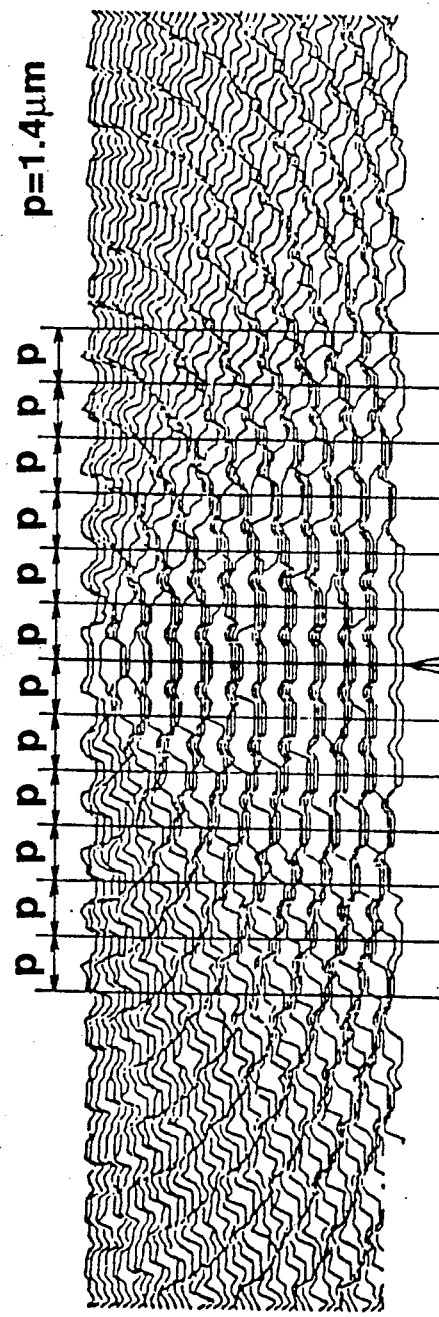
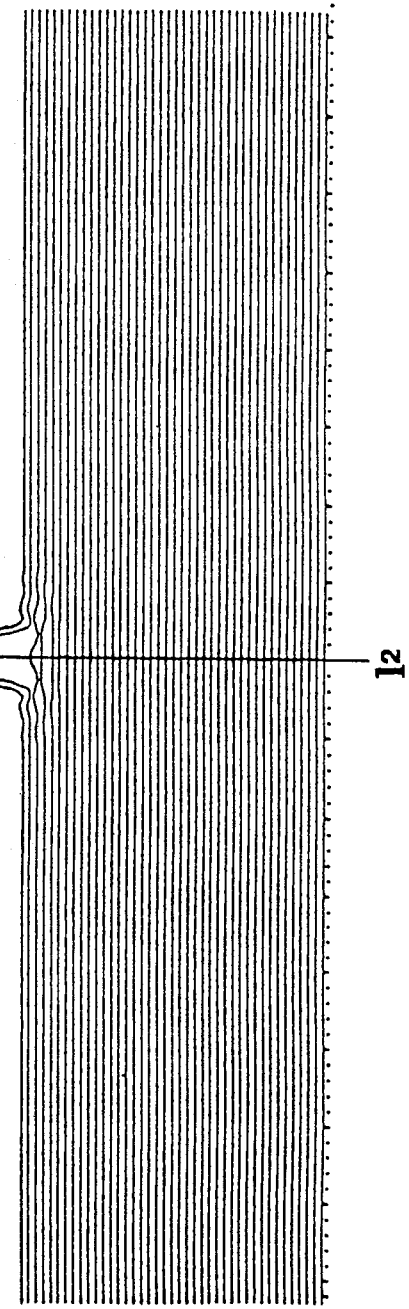
FIG.19A
FIG.19B

TRACKING CONTROL METHOD FOR ELIMINATING A TRACKING ERROR DUE TO A MOVEMENT OF AN OBJECTIVE LENS

BACKGROUND OF THE INVENTION

As shown in FIG. 21, laser beam from a laser source 1 is converted into incident parallel beam by a collimator lens 2 and then enters a half mirror 3. The incident parallel light beam through the half mirror 3 is collected by an objective lens 4 into convergent light beam and irradiated on a recording or reflecting face $5_1$ of an optical disk 5 having preformed grooves provided therein. Light beam reflected on the recording face $5_1$ of the optical disk 5 is converted into reflected parallel beam by the objective lens 4 and then reflected by the half mirror 3 to reach respective detectors $6_1$ and $6_2$ of two-divided detector means 6.

A tracking control circuit 9 is adapted to output a tracking control signal so that the light quantities detected by the respective detectors $6_1$ and $6_2$ are equal to each other. Objective lens drive means 7 is adapted to drive the objective lens 4 in a radius direction of the optical disk (in a direction traversing the track of the optical disk) in accordance with the tracking control signal from the tracking control circuit 9.

As noted from FIG. 21, the incident parallel beam is a circular beam having a beam diameter of $d_1$ while the reflected parallel beam is a circular beam having a beam diameter of $d_2$. Accordingly, if the objective lens 4 is so set as to move in a direction of A or B within a range of the incident parallel beam, then the diameter $d_2$ of the reflected parallel beam will be substantially equal to a diameter a of the objective lens 4. Also, the position of optical path of the reflected parallel beam will move in accordance with the movement of the objective lens 4.

The optical pick-up 8 includes the laser source 1, the collimator lens 2, the half mirror 3, the objective lens 4, the two-divided detector means 6 and the objective lens drive means 7.

The tracking control may be accomplished by selectively moving the whole optical pick-up 8 or only the objective lens 4 within the optical pick-up 8 in accordance with the distance of movement and/or the speed of movement thereof. In FIG. 21, only the objective lens 4 is shown to move.

FIGS. 7A and 7B illustrate distributions of phase and intensity of the incident parallel beam, respectively, while FIGS. 8A and 8B illustrate distributions of phase and intensity of incident parallel beam on the objective lens 4 when a center of the objective lens 4 is so positioned as to be coincident with a center of the incident parallel beam. As noted from FIG. 8B, the intensity distribution at that time is substantially of smooth gauss one having the maximum point provided at the center of beam and being zero at the position corresponding to the incident parallel beam interrupted by an objective lens holder $4_1$.

FIGS. 9A and 9B illustrate distributions of phase and intensity of the convergent beam into which the incident parallel beam is converted by the objective lens 4 when it irradiates the reflecting face $5_1$ of the optical disk 5 having no groove provided at a just-focus state thereof, respectively. As noted from FIG. 9B, the intensity increases only at the center of beam and declines near the center of beam although it decreases in a wavelike manner. Also, as noted from FIG. 9A, phase advancing portions (protrusion portions) and phase delaying portions (recess portions) are alternately provided in a concentric manner relative to the center of the beam. Furthermore, FIGS. 10A and 10B illustrate distributions of phase and intensity of the parallel light beam into which the reflected beam is converted by the objective lens 4. As noted from these figures, the distributions of phase and intensity of the reflected parallel beam are substantially identical to those of the incident parallel beam irradiating the objective lens 4.

FIGS. 11A and 11B illustrate distributions of phase and intensity of the convergent beam irradiating the reflecting face $5_1$ of the optical disk 5 having the grooves provided therein at just-focus and on-track states in the condition of the objective lens 4 being at the standard position where the center of the objective lens 4 is coincident with the center of the incident parallel beam. In FIGS. 11A and 11B, the various conditions are set as follows;

(1) wavelength of laser $\lambda = 0.78$ μm
(2) ratio of opening of objective lens NA = 0.52
(3) ratio of land width relative to groove width = 3:1
(4) depth of groove = $\lambda/8$
(5) $\lambda/NA = 1.5$ μm
(6) track pitch p = 1.4 μm As noted from FIG. 11B, the intensity distribution of the convergent beam irradiating the optical disk 5 is identical to that of the beam irradiating the reflecting face of the optical disk having no groove, but as noted from FIG. 11A, the phase distribution at its protrusion portions (the phase advancing portions) and at its recess portions (the phase delaying portions) is deformed by the effect of the grooves in the reflecting face thereof.

FIGS. 12A and 12B illustrate distributions of phase and intensity of the reflected parallel beam into which the reflected beam from the reflecting face of the optical disk 5 is converted by the objective lens 4, respectively. As noted from FIG. 12B, the intensity distribution of the reflected parallel beam has an arcuate recess portion $g_1$ arcuately expanding in a rightwardly and leftwardly symmetrical manner relative to a center line $l_1$ in comparison with the intensity distribution of FIG. 10B so that there are produced rightward and leftward protrusions $r_1$ and $r_2$. The arcuate recess portion $g_1$ has the minimum width $w_1$.

The center line $l_1$ includes the center of the incident parallel beam and is drawn corresponding to a direction in which the grooves are formed. Thus, it will be noted that the center line $l_1$ corresponds to the boundary line of the detected areas of the two-divided detector means 6. Therefore, as the detector $6_1$ detects the reflected light quantity $q_1$ corresponding to the area $D_1$ of the intensity distribution while the detector $6_2$ detects the reflected light quantity $q_2$ corresponding to the area $D_2$ thereof, the thus detected light quantities are equal to each other.

FIGS. 13A and 13B illustrate distributions of phase and intensity of light beam on the reflecting face $5_1$ of the optical disk 5 in case of the track pitch p being 1.6 μm in the condition of the objective lens 4 being at the standard position while FIGS. 14A and 14B illustrate those of the reflected parallel beam at that case. As noted from FIG. 13A, the phase distribution at its protrusion portions (the phase advancing portions) and at its recess portions (the phase delaying portions) is deformed by the effect of the grooves in the reflecting face thereof. As noted from FIG. 14B, the intensity distribution of the reflected parallel beam has an arcuate recess portion $g_2$ and an arcuate protrusion portion $c_1$ formed in a rightwardly and leftwardly symmetrical manner relative to the center line $l_1$.

As aforementioned, in case of the relation between the track pitch p and $\lambda/NA$ being $p<\lambda/NA$, the protrusions $r_1$ and $r_2$ are formed with the arcuate recess portions $g_1$ disposed therebetween as shown in FIG. 12B, and in case of the relation between the track pitch p and $\lambda/NA$ being $p>\lambda/NA$, the arcuate protrusion portion $c_1$ is formed as shown in FIG. 14B.

In the relation between the track pitch p and $\lambda/NA$ being $p<\lambda/NA$, the relation between the minimum width $w_1$ and the track pitch p is expressed by the following expression wherein a is the diameter of the objective lens.

$$w_1/a = 1 - p/(\lambda/NA) \qquad (1)$$

FIGS. 15A and 15B illustrate distributions of phase and intensity of light beam on the reflecting face $5_1$ of the optical disk 5 in case of the track pitch p being 1.4 $\mu$m in the condition of the objective lens 4 being at the standard position and in case of the irradiation point being offset by 0.1 $\mu$m from the on-track position in one of the radius directions of the optical disk 5 while FIGS. 16A and 16B illustrate those of the reflected parallel beam at that case. As noted from FIG. 15A, the phase distribution at its protrusion portions (the phase advancing portions) and at its recess portions (the phase delaying portions) is deformed by the effect of the grooves in the reflecting face thereof. As noted from FIG. 16B, the intensity distribution of the reflected parallel beam has a protrusion $r_3$ and a recess $c_3$ formed between an arcuate recess portion $g_3$. Therefore, the relation between the reflected light quantity $q_1$ detected by the detector $6_1$ corresponding to the area $D_1$ of the intensity distribution and the reflected light quantity $q_2$ detected by the detector $6_2$ corresponding to the area $D_2$ thereof is $q_2 > q_1$. Thus, it will be noted that a difference between them indicates tracking error quantity.

FIGS. 17A and 17B illustrate distributions of phase and intensity of the reflected parallel beam in case of the track pitch p being 1.6 $\mu$m in the condition of the objective lens 4 being at the standard position and also in case of the irradiation point being offset by 0.1 $\mu$m from the on-track position in one of radius directions of the optical disk 5. As noted from FIG. 17B, the intensity distribution of the reflected parallel beam has an arcuate recess portion $g_2$ and an arcuate protrusion portion $c_1$ formed in a rightwardly and leftwardly symmetrical manner relative to the center line $l_1$, respectively and a protrusion $r_4$ and a recess $c_2$ formed with the portions $g_2$ and $c_1$ disposed thererbetween.

FIGS. 18A and 18B illustrate distributions of phase and intensity of the incident parallel beam on the objective lens 4 when the center of the objective lens 4 is offset by 200 $\mu$m in one of the radius directions of the optical disk 5 from the center of the incident parallel beam. This condition corresponds to the condition in which the center of the objective lens 4 is so controlled as to move by 200 $\mu$m in one of the radius directions of the optical disk 5 from the standard position coinciding with the center of the incident parallel beam. A center line $l_2$ of FIG. 18B includes the center of the objective lens 4 and is drawn in a direction in which the grooves are formed.

As noted from FIG. 18B, the intensity distribution at that time is substantially of smooth gauss one having the maximum point offset by 200 $\mu$m from the center of the objective lens 4.

FIGS. 19A and 19B illustrate distributions of phase and intensity of the convergent beam on the reflecting face $5_1$ of the optical disk 5 having the grooves formed therein in case of the center of the objective lens 4 being offset by 200 $\mu$m in one of radius directions of the optical disk 5 from the center of the incident parallel beam and also in case of the convergent beam irradiating the reflecting face $5_1$ of the optical disk 5 at the state of just-focus and on-track under the aforementioned setting condition. FIGS. 20A and 20B illustrate distributions of phase and intensity of the reflected parallel beam into which the beam reflected on the reflecting face $5_1$ of the optical disk 5 is converted by the objective lens 4, respectively. A center line $l_1$ of FIGS. 20A and 20B corresponds to the boundary line of the detecting areas $D_1$ and $D_2$ for the detectors $6_1$ and $6_2$ of the two-divided detector means 6.

FIG. 6A shows a cross-sectional face of the intensity distribution of FIG. 20B in a solid line. As noted from this figure, the arcuate groove portion $g_3$ moves in a direction of the area $D_2$ and the intensity corresponding to a protrusion $r_6$ increases relative to that corresponding to a protrusion $r_5$. This is caused by the position of the maximum intensity distribution of the incident parallel beam incident on the objective lens 4 shown in FIG. 18B being offset from the center of the objective lens 4. Estimating a ratio of the reflected light quantities $q_1$ and $q_2$ detected by the detectors $6_1$ and $6_2$, $q_1/q_2 = 1/1.23$ is obtained and there occurs a difference between the reflected light quantities detected by the detectors $6_1$ and $6_2$ in spite of the on-track condition.

FIG. 6A shows a cross-sectional face of the intensity distribution of light beam in case of the center of the objective lens 4 being offset by 200 $\mu$m in the other radius direction of the optical disk 5 from the center of the incident parallel beam in a dotted line. A ratio of the reflected light quantities $q_1$ and $q_2$ detected by the detectors $6_1$ and $6_2$ is $q_1/q_2 = 1.23/1$ and there occurs a difference between the reflected light quantities detected by the detectors $6_1$ and $6_2$ in the same manner.

It will be noted that the prior tracking control tends to produce the difference between the reflected light quantities detected by the respective detectors of the two-divided detector means in spite of the irradation point being in the condition of on-track when the objective lens within the optical pick-up moves in the radius direction of the optical disk. Thus, an accurate tracking error information cannot be advantageously obtained.

SUMMARY OF THE INVENTION

Accordingly, it is a principal object of the invention to provide a tracking control method adapted to obtain an accurate tracking error information even though at least an objective lens within an optical pick-up moves in a radius direction of an optical disk.

It is another object of the invention to provide a tracking control method adapted to obtain an accurate tracking control error information in a simplified manner.

In accordance with the present invention, there is provided a tracking control method in which at least an objective lens within an optical pick-up is controlled so as to be driven in a radius direction of an optical disk having grooves formed having a predetermined track pitch relative to respective detectors of two-divided detector means for detecting reflected light quantities of reflected beam obtained by irradiating laser convergent beam of spot diameter defined by λ/NA on said optical disk, said detectors being disposed in a manner in which a detection range is divided in a direction corresponding to said radius direction of said optical disk and said objective lens being driven based on a difference information between said detected reflected light quantities;

Characterized in that said spot diameter of said convergent beam being so set as to be more than said track pitch and that a range of said reflected beam is a predetermined range symmetrical relative to a division line of said detectors in spite of an optical path of said reflected beam moving in accordance with movement of said objective lens.

This causes the respective detectors of the two-divided detector means to detect substantially equal reflected light quantities in the condition of the irradiation point being at the on-track position even though the objective lens within the optical pick-up moves in the radius direction of the optical disk.

BRIEF DESCRIPTION OF THE DRAWINGS

The above and other objects and features of the invention will be apparent from the description of the embodiment taken along with the accompanying drawings in which;

FIGS. 2A through 5A and FIGS. 7A through 20A illustrate distributions of phase of light beam in various different conditions;

FIGS. 2B through 5B and FIGS. 7B through 20B illustrate distributions of intensity of light beam in various different conditions corresponding to those of FIGS. 2A through 5A and FIGS. 7A through 20A;

DETAILED DESCRIPTION OF THE EMBODIMENTS

Figures 1A, 1B, 1C:
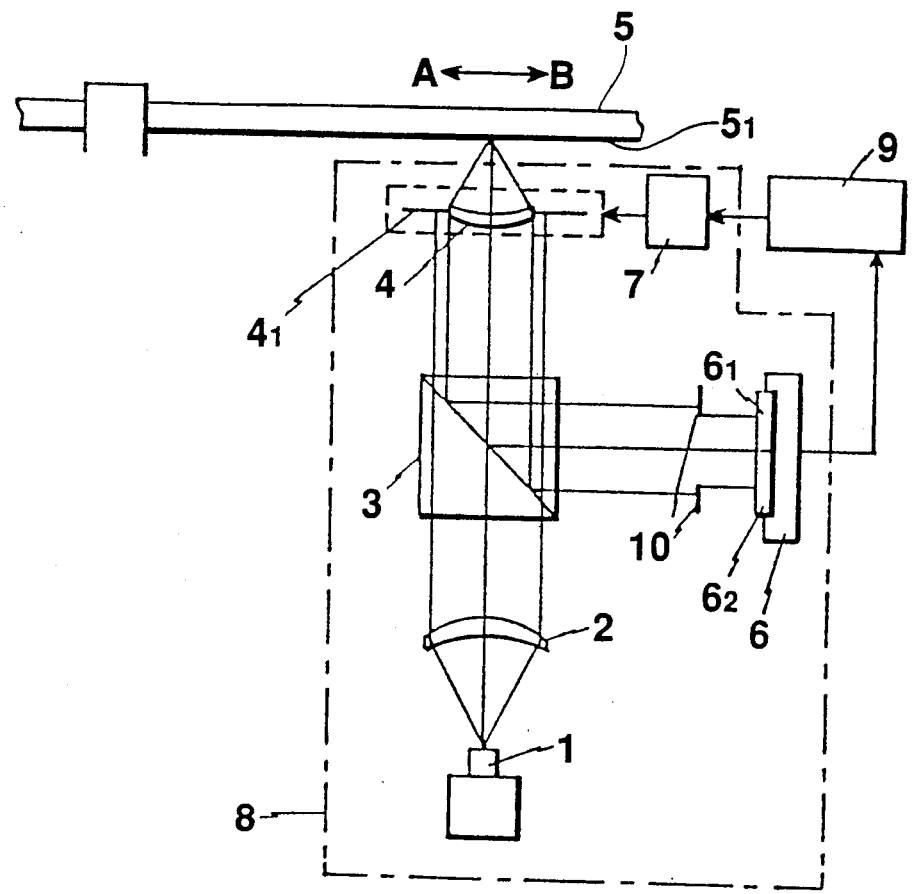
FIG. 1A is a schematic diagram of a system for carrying out a tracking control method of the invention in one embodiment.
FIG. 1B illustrates a beam shutter used for the invention in a front view.
FIG. 1C illustrates a modified beam shutter used for the invention in a front view.

As shown in FIG. 1A, laser beam from a laser source 1 is converted into incident parallel beam by a collimator lens 2 and then enters a half mirror 3. The incident parallel beam through the half mirror 3 is collected by an objective lens 4 into convergent light beam and irradiates a recording or reflecting face $5_1$ of an optical disk 5 having preformed grooves provided therein. Light beam reflected on the reflecting face $5_1$ of the optical disk 5 is converted into reflected parallel beam by the objective lens 4 and then reflected by the half mirror 3 to reach respective detectors $6_1$ and $6_2$ of two-divided detector means 6.

A tracking control circuit 9 is adapted to output a tracking control signal so that the light quantities detected by the respective detectors $6_1$ and $6_2$ are equal to each other. Objective lens drive means 7 is adapted to drive the objective lens 4 in a radius direction of the optical disk (in a direction traversing the track of the optical disk) in accordance with the tracking control signal from the tracking control circuit 9.

The optical pick-up 8 includes the laser source 1, the collimator lens 2, the half mirror 3, the objective lens 4, the two-divided detector means 6 and the objective lens drive means 7.

Although, in the illustrated embodiment, only the objective lens 4 moves in accordance with the tracking control signal by means of the objective lens drive means 7, it will be understood that the tracking control may be accomplished by moving the whole optical pick-up 8.

A beam shutter 10 may be also securely disposed in an optical path between the half mirror 3 and the two-divided detector means 6 within the optical pick-up 8 and serves to interrupt the reflected parallel beam deflected by the half mirror 3. As noted from FIG. 1B, the beam shutter 10 includes a window $10_1$ having two divided line corresponding to a division line $6_3$ of the two-divided detector means 6 when viewed from the half mirror 3. Thus, it will be noted that exclusive reflected beam passing through the window $10_1$ reaches the respective detectors $6_1$ and $6_2$ of the two-divided detector means 6.

As noted from FIG. 1B, as the objective lens 4 moves in the radius direction of the optical disk 5 within the optical pick-up 8 by means of the objective lens drive means 7, a spot s of the reflected beam on the beam shutter 10 also moves in a direction of arrangement of the respective detectors as indicated by a dotted line of FIG. 1B. The window $10_1$ is so set that the window $10_1$ is always within the spot s when the spot s moves within the predetermined range.

FIGS. 2A through 5A and FIGS. 2B through 5B illustrate distributions of phase and intensity of the reflected beam passing through the window $10_1$ of the beam shutter 10 under various setting conditions, respectively. An outer diameter $d_4$ of the respective intensity distributions corresponds to an inner diameter of the window $10_1$ of the beam shutter 10 while the center lines $l_1$ of these figures correspond to the division line $6_3$ of the two-divided detector means 6. Thus, it will be noted that the areas $D_1$ and $D_2$ correspond to the detecting areas of the detectors $6_1$ and $6_2$, respectively.

Figure 2A:
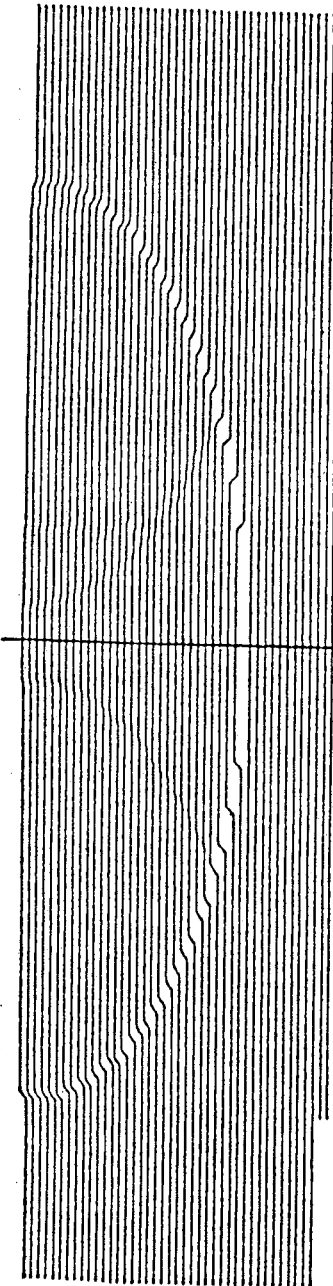
Figure 2B:
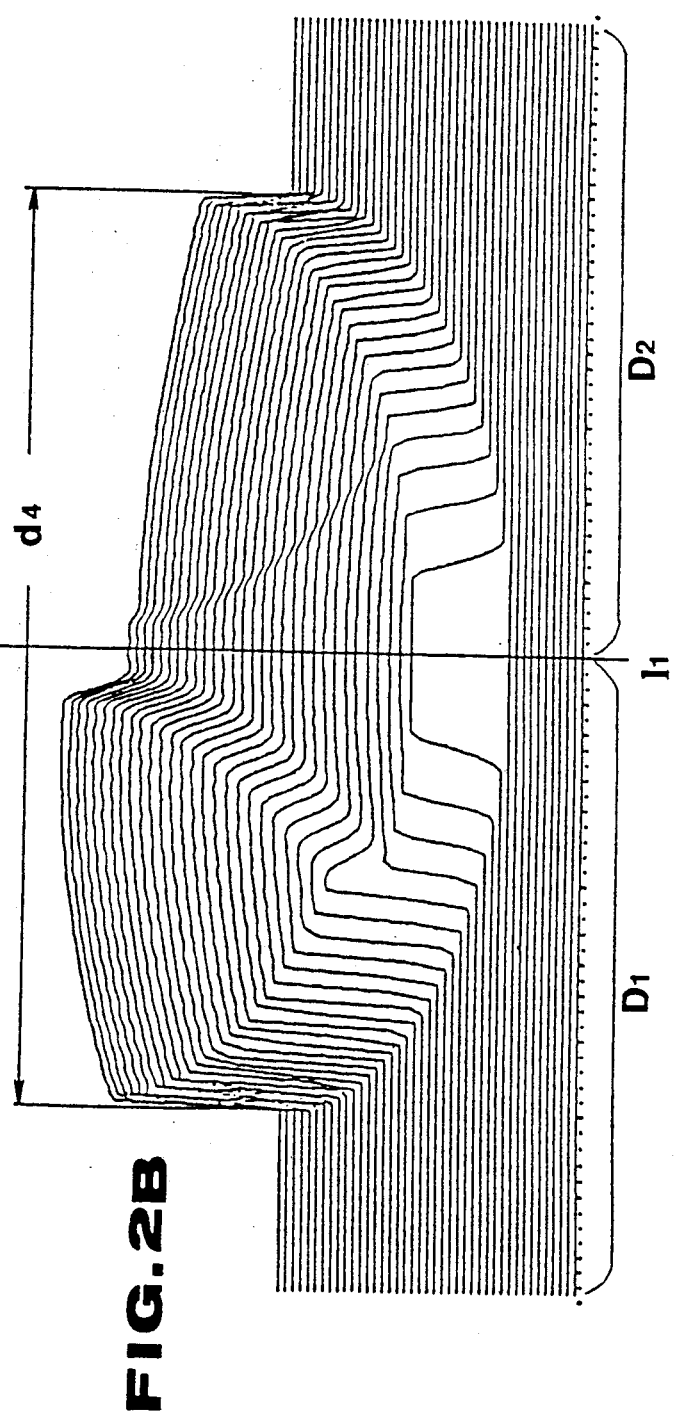

FIGS. 2A and 2B illustrate the distributions of phase and intensity of reflected beam in case of the objective lens 4 being at the standard position and in case of the irradiation point being offset by 0.1 μm in the other radius direction of the optical disk 5 from the on-track position at the state of just-focus under the following setting conditions (1) through (6).

(1) wavelength of laser λ=0.78 μm
(2) ratio of opening of objective lens NA=0.52
(3) ratio of land width relative to groove width=3:1
(4) depth of groove=λ/8
(5) λ/NA=1.5 μm
(6) track pitch p=1.4 μm.

Figure 3A:
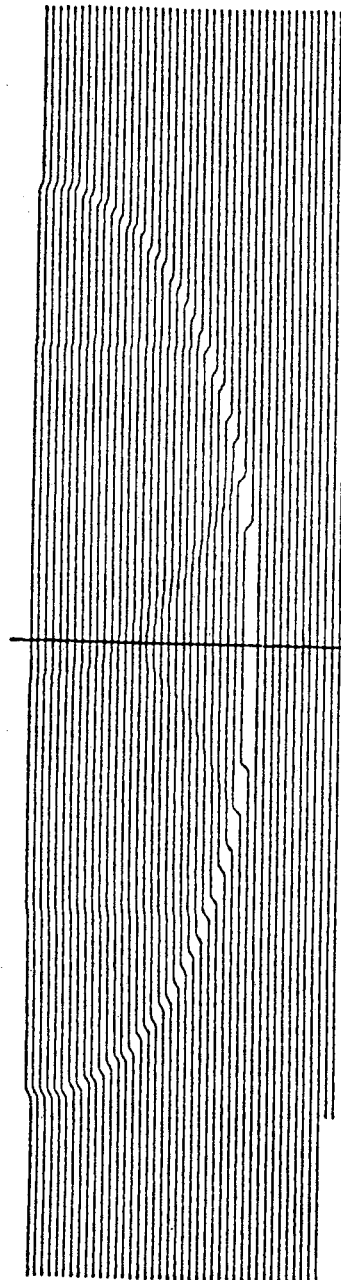
Figure 3B:
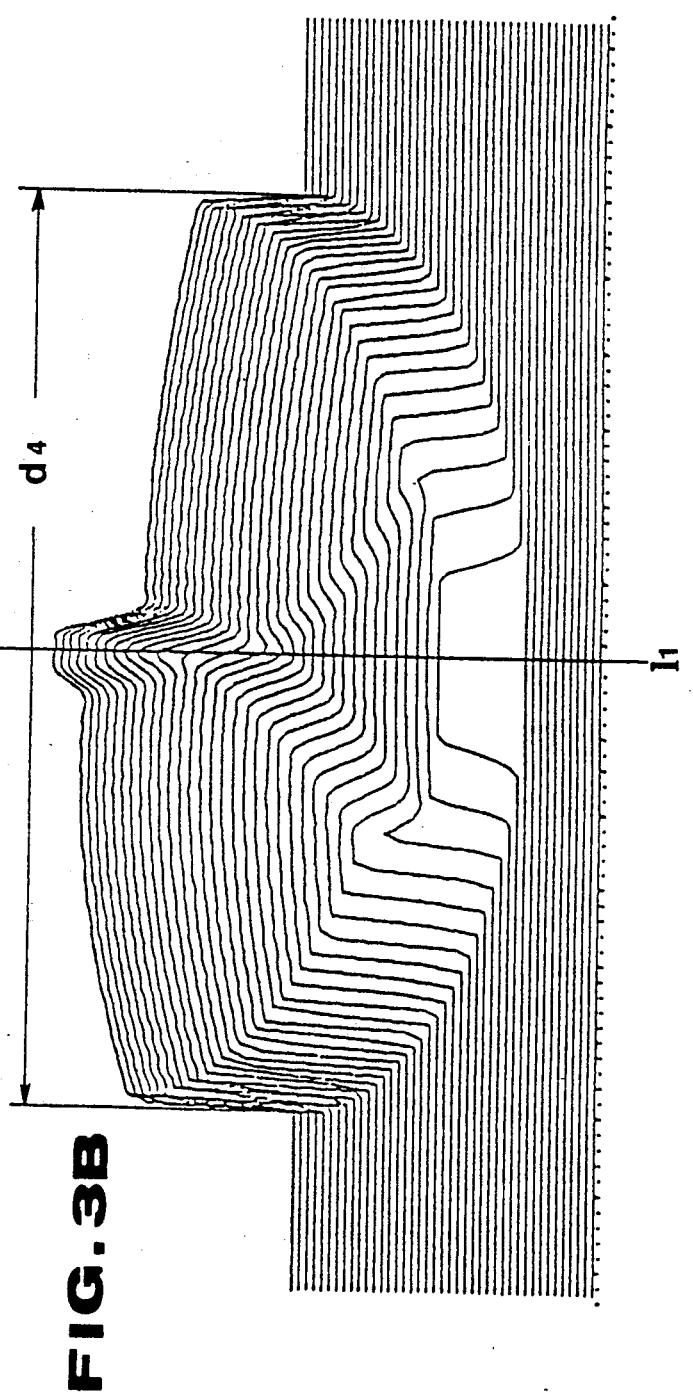

FIGS. 3A and 3B illustrate the distributions of phase and intensity of reflected beam in case of the track pitch p being 1.6 μm and in case of the irradiation point being offset by 0.1 μm in the other radius direction of the optical disk 5 from the on-track in the condition of the objective lens 4 being at the standard position.

Figure 4A:
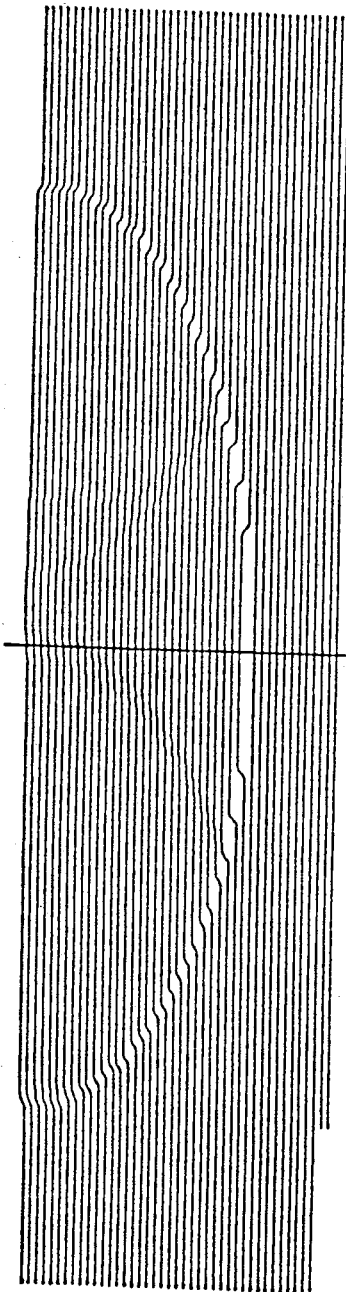
Figure 4B:
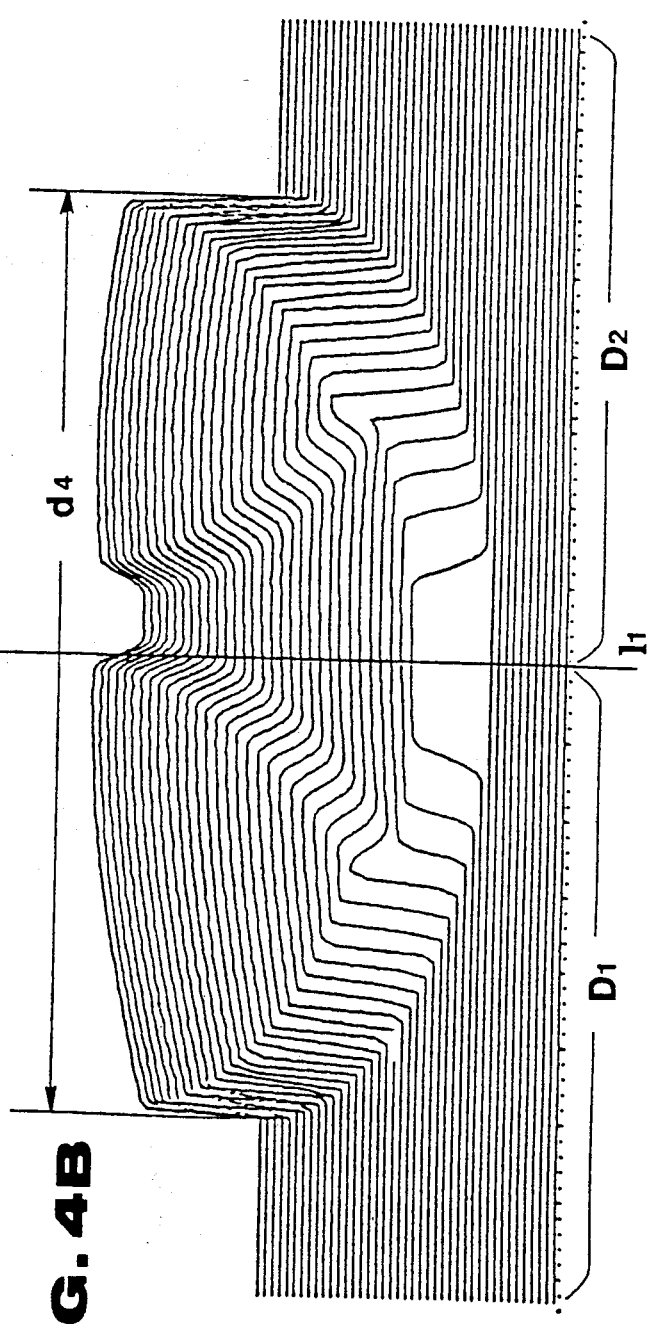

FIGS. 4A and 4B illustrate the distributions of phase and intensity of reflected beam in case of the track pitch p being 1.4 μm and in case of the center of the objective lens 4 being offset by 200 μm in one of the radius directions of the optical disk from the standard position corresponding to the center of incident parallel beam when the irradiation point is in the on-track position at the just-focus state. A cross sectional face of the intensity distribution of FIG. 4B is indicated by the solid line of FIG. 6A and the range of distribution is limited by an inner diameter $d_4$ of the window $10_1$ of the beam shutter 10.

Figure 6A:
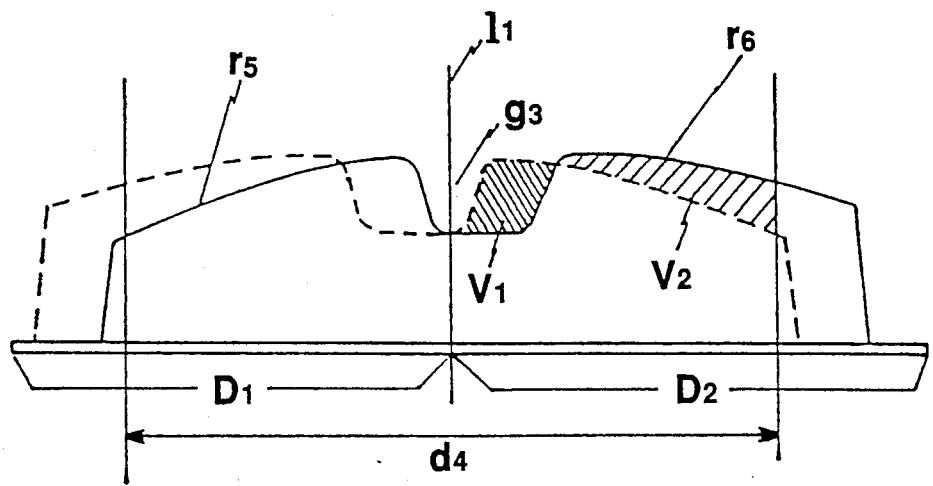
FIGS. 6A and 6B illustrate cross sectional faces of specified intensity distributions.

A cross sectional face of the intensity distribution when the objective lens 4 moves by 200 μm in the other radius direction of the optical disk 5 from the standard position thereof is indicated by a dotted line of FIG. 6A and the range of distribution is also limited by the inner diameter $d_4$ of the window $10_1$ of the beam shutter 10. It will be noted that the intensity distributions are rightwardly and leftwardly symmetrical relative to the center axis $l_1$.

The window $10_1$ of the beam shutter 10 is so set as to make the reflected light quantities $q_1$ and $q_2$ detected by the respective detectors $6_1$ and $6_2$ equal to each other.

The details of this will be described hereinbelow with reference to FIG. 6B. Solid line, chain line and dotted line of FIG. 6B indicate cross sectional faces of the intensity distributions formed when the objective lens 4 is at the standard position, moves by 200 μm in one of the radius directions of the optical disk 5 and moves by 200 μm in the other radius direction of the optical disk 5, respectively.

Variation $\Delta q_1$ in the reflected light quantity detected by the detector $6_1$ when the objective lens 4 moves by 200 μm from the standard position in the one of the radius directions becomes a difference between a portion of distribution $v_4$ increasing by the movement thereof and a portion of distribution $(v_3 + v_{51})$ decreasing thereby as follows;

$$\Delta q_1 = v_4 - (v_3 + v_{51})$$

Variation $\Delta q_2$ in the reflected light quantity detected by the detector $6_2$ at that time becomes a difference between a portion of distribution $v_6$ increasing by the movement thereof and a portion of distribution $(v_7 + v_{52})$ decreasing thereby as follows;

$$\Delta q_2 = v_6 - (v_7 + v_{52})$$

Thus, it will be noted that reflected light quantities detected by the detectors $6_1$ and $6_2$ when the objective lens 4 moves can be equal to each other by establishing the following expression;

$$\Delta q_1 = \Delta q_2 \quad (2)$$

Figure 6B:
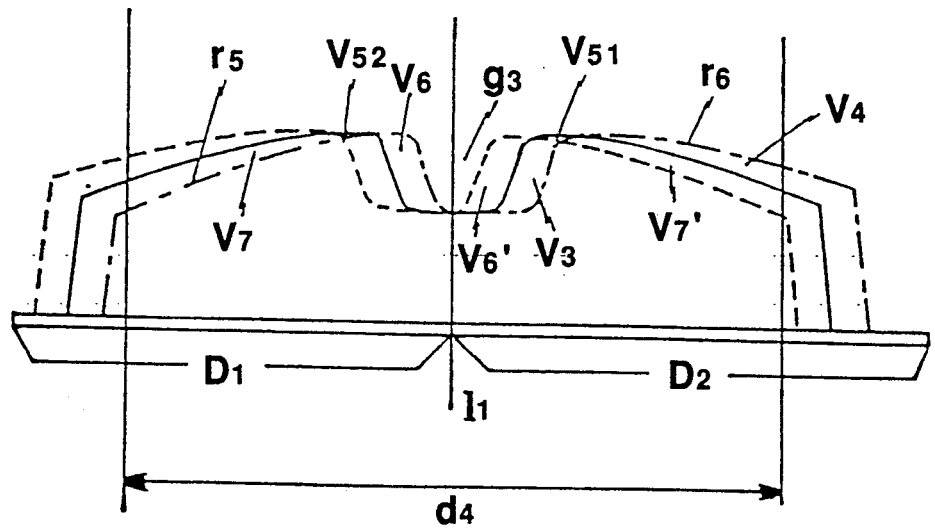
Figure 9A:
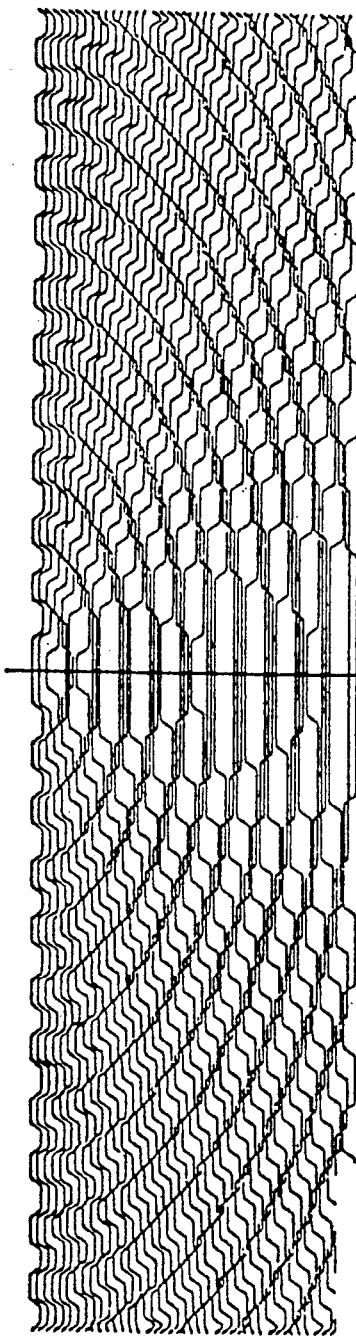
Figure 9B:
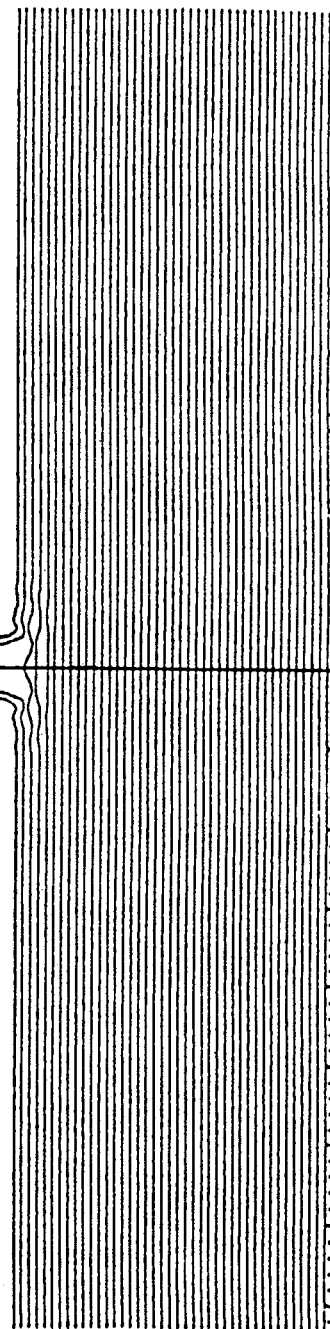
Figure 12A:
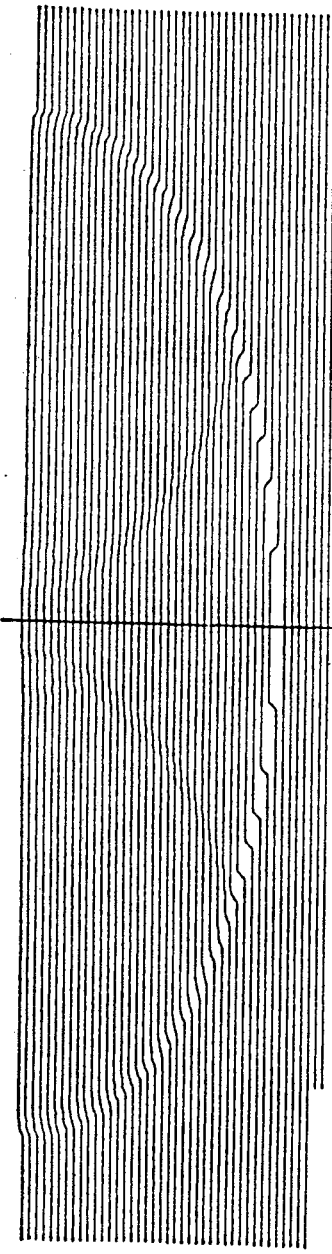
Figure 12B:
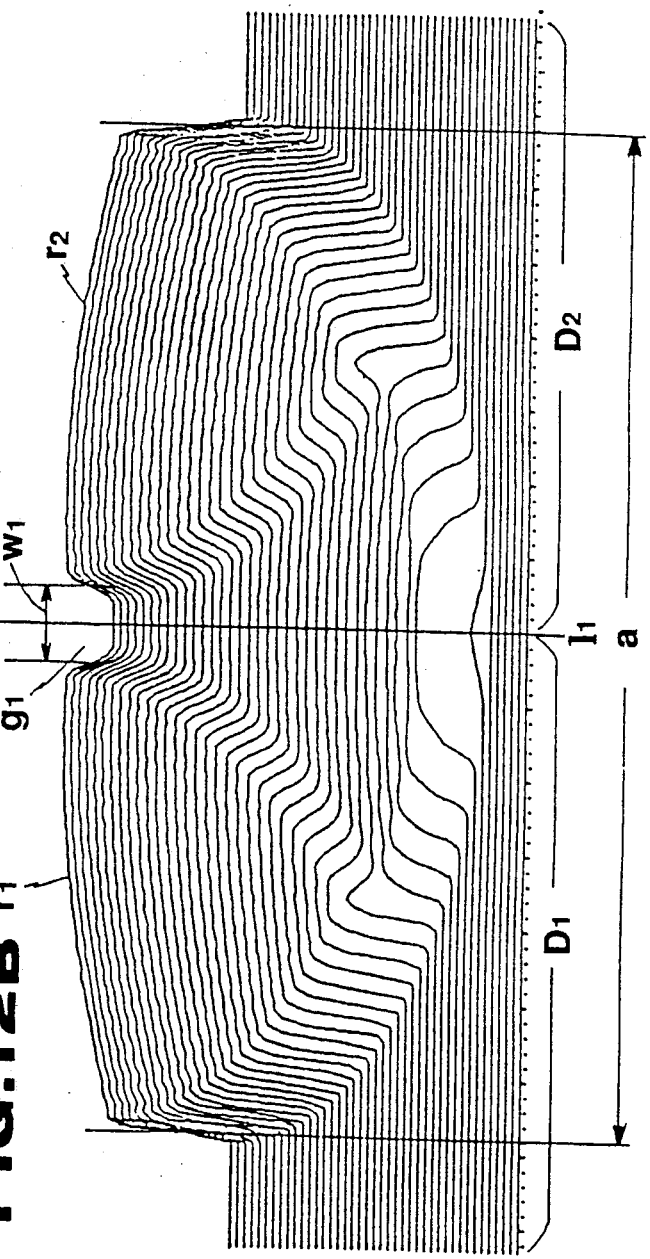
Figure 15A:
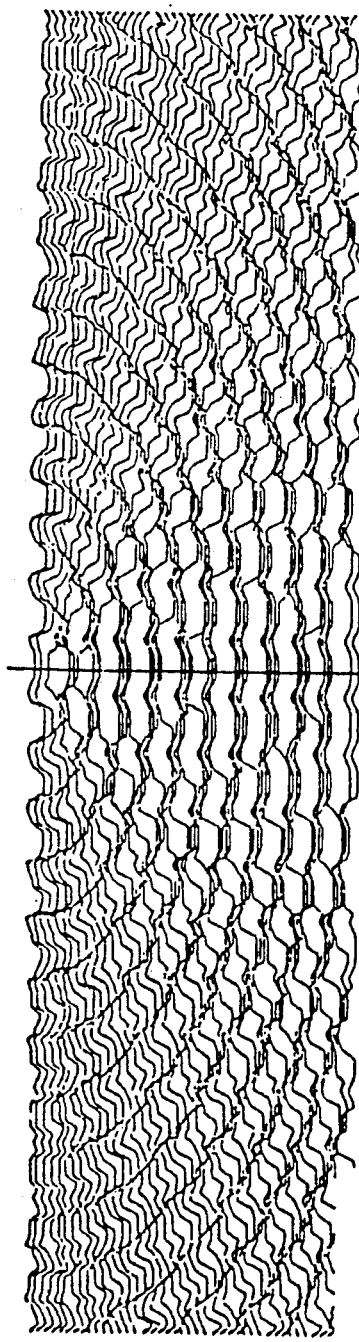
Figure 15B:
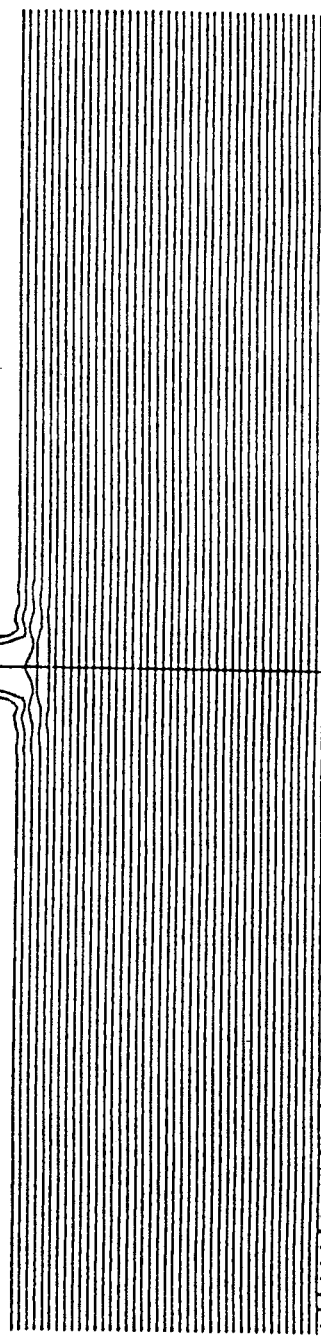
Figure 16A:
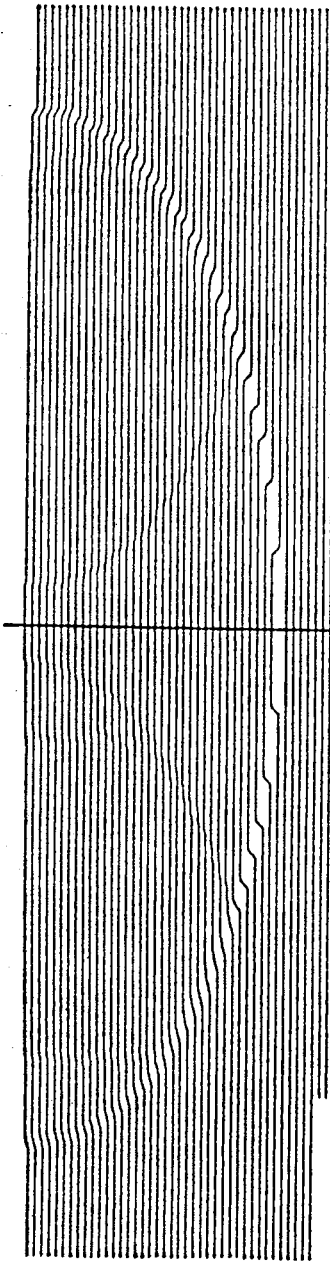
Figure 16B:
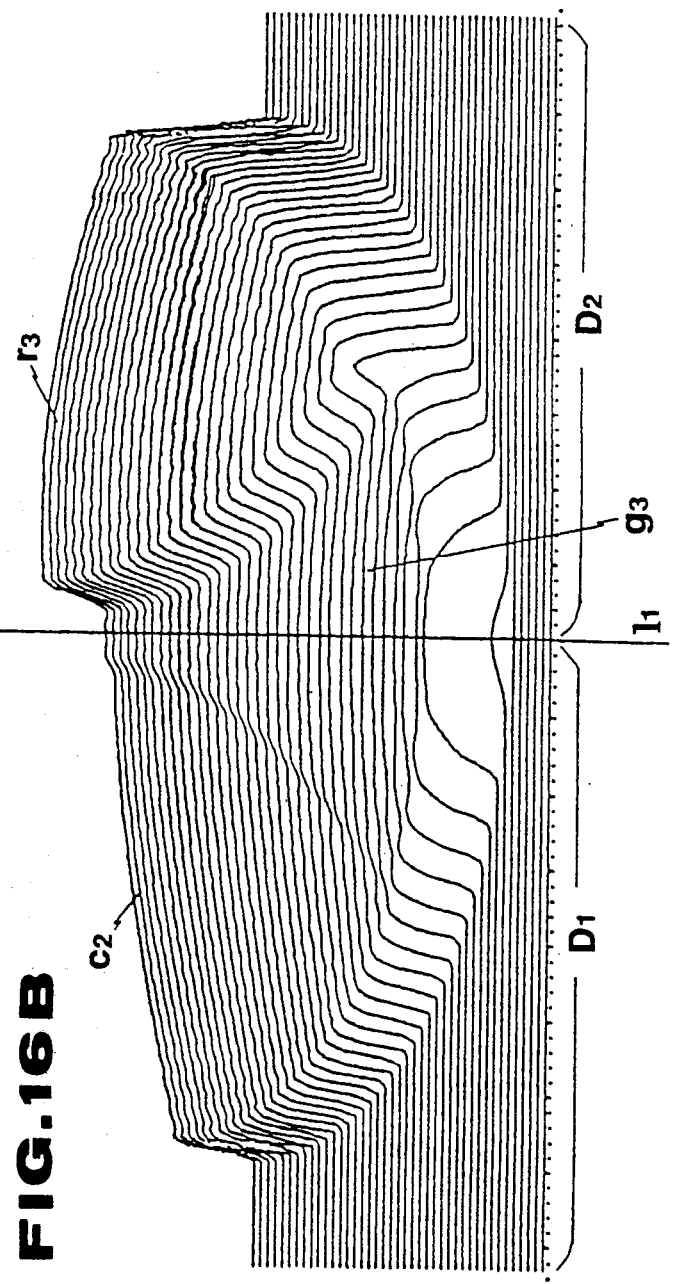
Figure 20A:
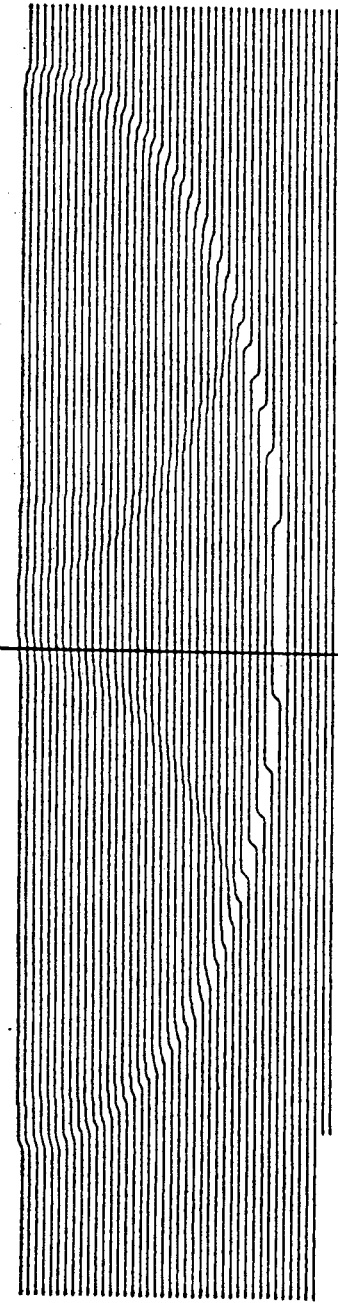
Figure 20B:
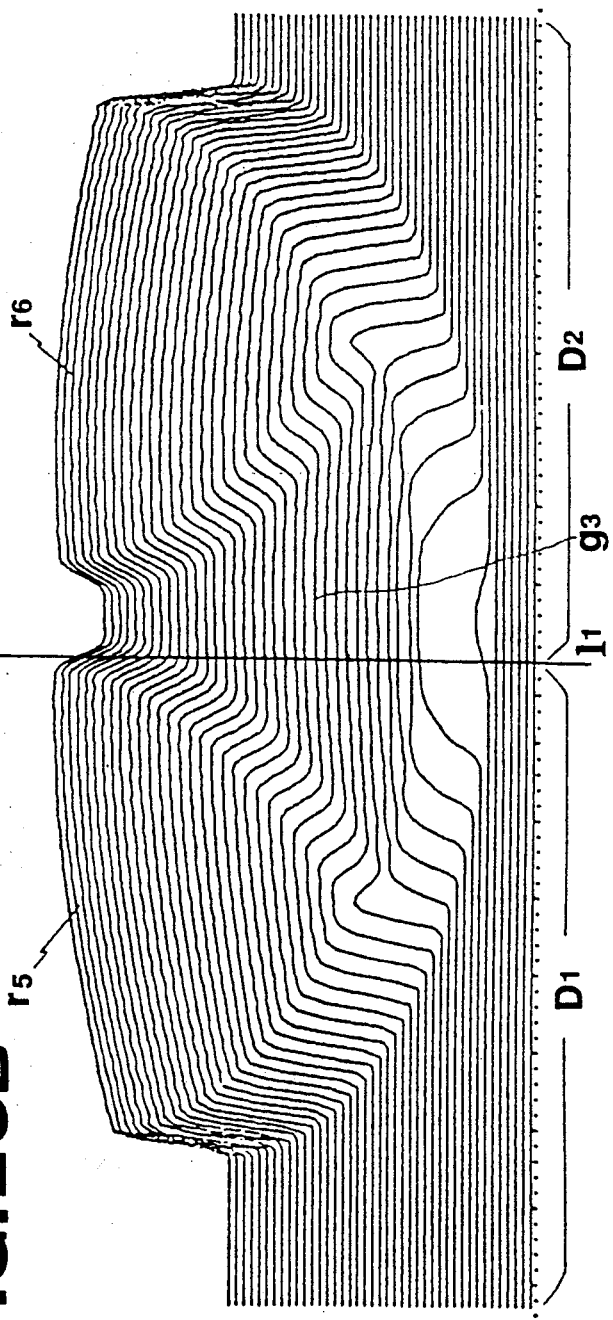
Figure 21:
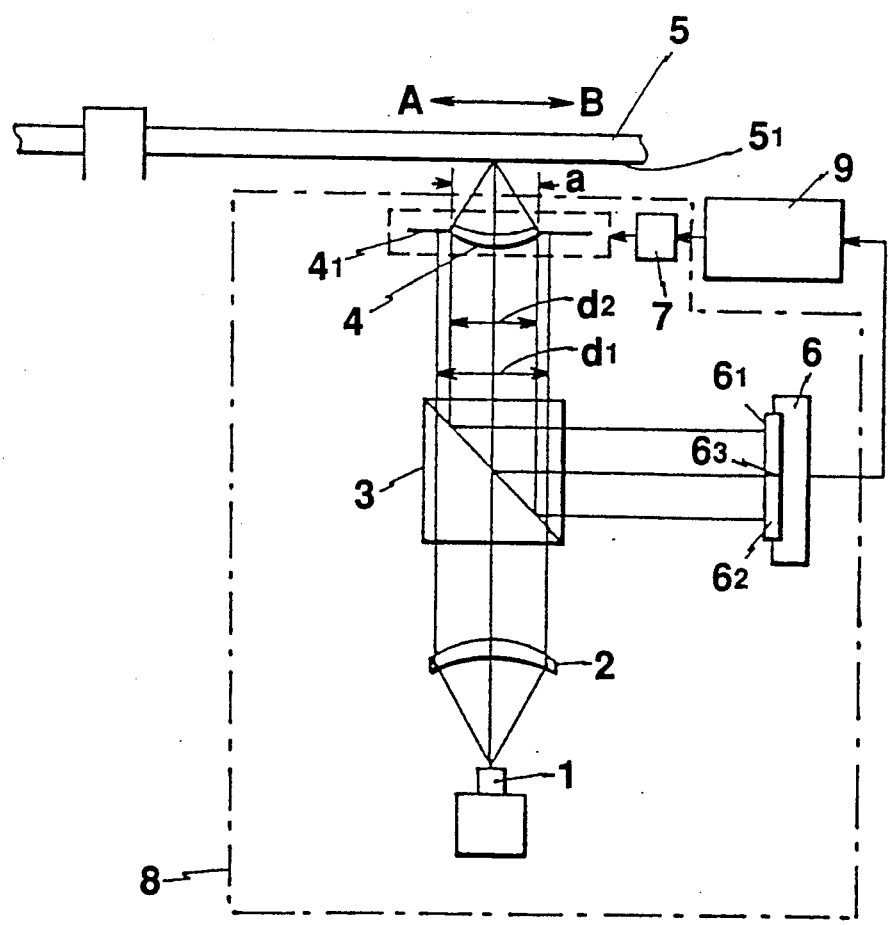
FIG. 21 illustrates a system for carrying out a prior art tracking control method.

In FIG. 6B, the following conditions of the respective distribution portions are established;

$$v_{51} = v_{52},$$

$$v_7 = v_7',$$

$$v_6 = v_6'$$

The expression (2) can be changed by replacing the expression (2) by these conditions as follows;

$$v_4 + v_7' = v_3 + v_6' \quad (3)$$

The expression (3) indicates that the window $10_1$ of the beam shutter 10 should be formed so that the distribution portions $v_1$ and $v_2$ of FIG. 6A are equal to each other in order to make equal to each other the reflected light quantities detected by the detectors $6_1$ and $6_2$.

Although the above description is made with respect to only one cross section of the intensity distribution, it should be noted that there has been practically considered variation in light quantities on all the cross sections of the intensity distribution.

In the intensity distribution of FIG. 4B, when the inner diameter $d_4$ of the window $10_1$ of the beam shutter 10 was set to be 6/7 of the outer diameter $d_3$ of the spot s of the reflected beam on the beam shutter 10, the calculated ratio of the reflected light quantities $q_1$ and $q_2$ detected by the respective detectors $6_1$ and $6_2$ was 1/1.02 and therefore they were substantially equal to each other.

FIGS. 5A and 5B illustrate the distribution of phase and intensity of reflected beam in case of the track pitch p being 1.6 μm and in case of the center of the objective lens 4 being offset by 200 μm in one of the radius directions of the optical disk from the standard position when the irradiation point is at the on-track position, but it will be apparent from the aforementioned description that if the arcuate protrusion $c_1$ is formed as in the intensity distribution, then the object of the invention cannot be accomplished.

While one embodiment of the invention has been illustrated and described with reference to the accompanying drawings, it will be understood by those skilled in the art that it is by way of example and that various changes and modifications may be made without departing from the spirit and scope of the invention. For example, although, in the illustrated embodiment, the window $10_1$ of the beam shutter 10 is circular, it will be understood that it is not defined thereto, and that it may be such polygonal as perfectly square, rectangular and like these. Furthermore, although, in the illustrated embodiment, there may be provided the beam shutter 10, it may be omitted by the fact that the two-divided detector means 6 may be replaced by a two-divided detector means 6' as shown in FIG. 1C. The two-divided detector means 6' of FIG. 1C comprises two detectors $6_1'$ and $6_2'$ divided so as to be symmetrical relative to a division line $6_3'$ with respect to a spot s' of the reflected beam moving within the predetermined range on the two-divided detector means 6' in accordance with movement of the objective lens 4. In this case, the two detectors $6_1'$ and $6_2'$ are disposed so as to always fall within the spot s'. In addition thereto, the optical instruments disposed along the optical path of laser beam are not defined to the one of the aforementioned embodiment, and a shaping prism may be additionally provided between the collimator lens 2 and the half mirror 3 for shaping the diameter of laser beam. It should be understood that the invention is defined only by the appended claims.

What is claimed is:

1. A tracking control method for eliminating a tracking error due to a movement of an objective lens comprising the steps of converting an incident parallel beam into a laser convergent beam of spot diameter defined by λ/NA by said objective lens and detecting reflected light quantities of reflected beam obtained by irradiating said laser convergent beam on an optical disk having grooves formed at a predetermined tracking pitch by means of respective detectors having a detection range divided in a radius direction of said optical disk in such a manner that said reflected light quantities are detected at a predetermined region about an optical axis of said reflected beam when said objective lens is located at a reference position where a center of said objective lens is consistent with an optical axis of said incident parallel beam whereby said objective lens is moved in a controlled manner in said radius direction of said optical disk relative to said detectors on an error information of said detected light quantities of said reflected light;

characterized in that a diameter of said laser convergent beam obtained by said objective lens is so set as to be smaller than that of said incident parallel beam and also to be more than said track pitch and that a range of said reflected beam is a predetermined range symmetrical relative to a division line of said detectors in spite of an optical path of said reflected beam moving in accordance with movement of said objective lens in said radius direction.

2. A tracking control method as set forth in claim 1, and wherein said range of said reflected beam is set by a beam shutter disposed along said optical path of said reflected beam and including a window having two-divided line corresponding to said division line of said two-divided detector means.

3. A tracking control method as set forth in claim 1, and wherein said range of said reflected beam is set by two-divided detector means comprising two detectors divided so as to be symmterical relative to said division line with respect to a spot of said reflected beam moving within said predetermined range on said two-divided detector means in accordance with movement of said objective lens and said two detectors being disposed so as to always fall within said spot.

* * * * *